R. Kent,

Punching Metals.

No. 89,226.   Patented Apr. 20, 1869.

Witnesses:
Fred. Haynes.
H. Kimmel

Inventor:
Robert Kent

ROBERT KENT, OF BROOKLYN, NEW YORK.

Letters Patent No. 89,226, dated April 20, 1869.

IMPROVEMENT IN PUNCHING-APPARATUS.

The Schedule referred to in these Letters Patent and making part of the same.

*To all whom it may concern:*

Be it known that I, ROBERT KENT, of Brooklyn, in the county of Kings, and State of New York, have invented a new and useful Portable Punching-Apparatus, for punching boiler-plates and other articles; and I do hereby declare that the following is a full, clear, and exact description of the same, reference being had to the accompanying drawing, forming a part of this specification, and in which—

Figure 1:
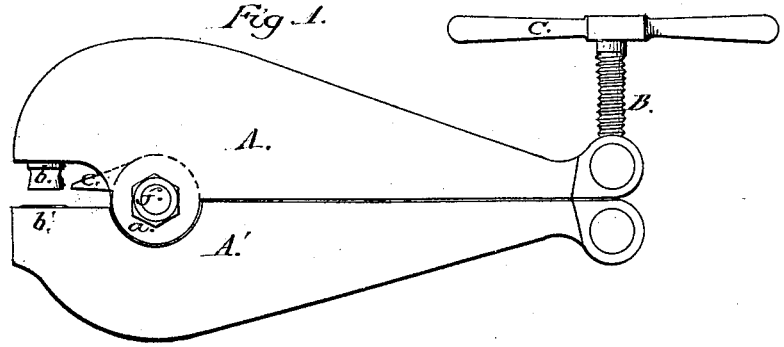
Figure 2:
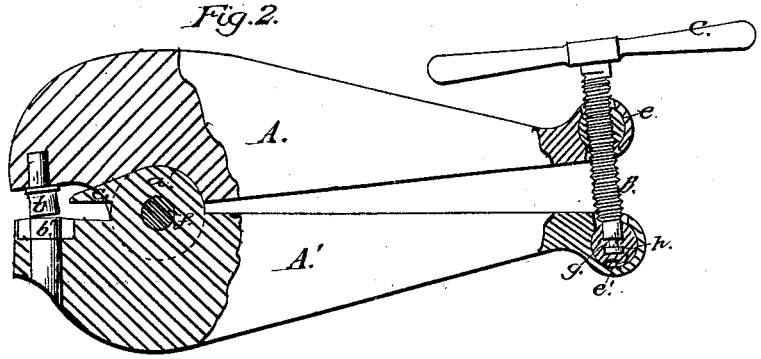

Figure 1 represents a side view of a portable punch constructed according to my invention, and Figure 2, a similar view of the same, with its extremities represented in section.

Similar letters of reference indicate corresponding parts in both figures.

This invention consists in a portable punching-apparatus for boiler-makers and others, composed of two levers pivoted together, carrying a punch and bolster at the ends of their shorter arms, and operated by a screw adjusted within a rolling nut and rolling bearing, at the ends of their longer arms, whereby a powerful action of the punch is produced.

To enable others to understand the construction and operation of the invention, I will proceed to describe it with reference to the drawings.

A A' are levers, constructed of such form as to combine strength and lightness in their greatest degrees.

Said levers are pivoted together at a point, *f*, near their larger extremities, by means of a centrally-projecting semicircular tenon, *a'*, provided upon the upper surface of the one entering between a mortised knuckle, *a a*, on the under surface of the other, so that the opening or closing of the longer arms of the levers will cause a contrary movement of the shorter arms.

*b* is a punch, of the ordinary construction, secured into the under side of the lever A, and near the extremity of its shorter arm.

Opposite this punch *b*, but in the shorter arm of the opposite lever, A', is arranged a bolster, *b'*, into which the said punch may fit during the engagement of the parts.

*c* is a forwardly-projecting stripper, provided upon the tenon *a'*, and extending parallel with the inner surface of the lever A', and, at a proper distance therefrom, for reception of the margin of the plate between it and the said lever.

*e* is a rolling nut, arranged at the extremity of the longer arm of the lever A.

Said nut *e* is of a cylindrical form, is fitted into a cylindrical bearing in the said extremity of the arm, and having provided in it, transversely to its axis, a threaded opening, through which passes a screw, B, having adjusted upon its upper end a handle, C.

At the extremity of the corresponding arm of the lever A', and opposite the said rolling nut *e* is arranged a rolling bearing, *e'*, for reception of the lower end of the screw B, so that during the opening and closing of the said arms, caused by the turning of the screw, the nut *e* and the bearing *e'* will retain their positions relative to each other.

Said bearing *e'* is provided with a pin, *h*, which fits into a reduced portion, or neck, *g*, of the screw B, for retention of the same within the said bearing *e'*.

The apparatus being adjusted as represented in fig. 1, the plate or other article to be punched is inserted under the punch *b* and stripper *c*, and above the bolster *b'*, or the apparatus is placed upon the said plate or article so as to receive the same in the manner as described, whereupon, by the forward turning of the screw B, the punch *b* may be made to penetrate the said plate or article, driving the portion, which it displaces, through the bolster.

The withdrawal of the punch *b*, from the plate, is effected by the backward turning of the screw.

What I claim as my invention, and desire to have secured by Letters Patent, is—

The arrangement, substantially as described, of the levers A A', fulcrum *f*, punch and bolster *b* and *b'*, screw B, and rocking nut and bearing *e* and *e'*, for the purpose set forth.

ROBERT KENT.

Witnesses:
FRED. HAYNES,
A. KINNIER.